March 29, 1938.     S. GUARNASCHELLI     2,112,239
LEAKPROOF COUPLING FOR METAL TUBING
Filed March 7, 1936
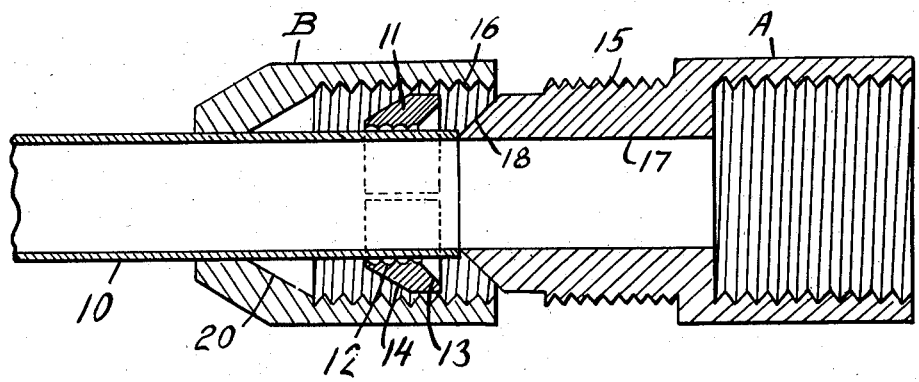
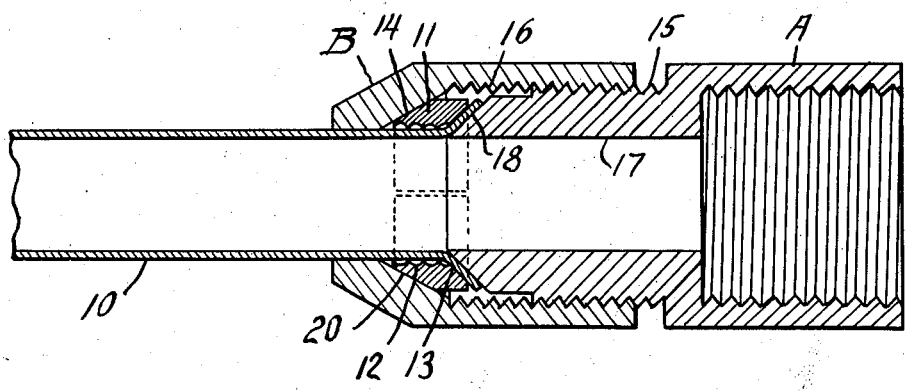
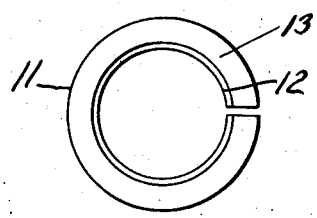
INVENTOR
Stephen Guarnaschelli
BY
Marshall & Hawley
ATTORNEYS Patented Mar. 29, 1938

2,112,239

UNITED STATES PATENT OFFICE 2,112,239

LEAKPROOF COUPLING FOR METAL TUBING

Stephen Guarnaschelli, Brooklyn, N. Y., assignor to Packless Metal Products Corporation, a corporation of Delaware Application March 7, 1936, Serial No. 67,624

1 Claim. (Cl. 285—86)

This invention relates to a leak-proof coupling for metal tubing.

Metal tubing, such as copper tubing, is used in many types of machines, as for instance, internal combustion engines, refrigerators, etc. When the tubing breaks it is practically impossible to form a new joint on the broken end and for this reason it is usually necessary to entirely replace the broken section.

Furthermore, at the present time, it is necessary for dealers to carry in stock many different lengths of tubing to meet the needs of the trade.

This invention has for its salient object to provide a simple and practical method of flaring the end of a metallic tube and at the same time coupling the flared end in a solderless leak-proof joint.

Another object of the invention is to provide a method and apparatus of the character specified so worked out as to require the use of no special tools.

Another object of the invention is to provide a pipe joint or coupling so constructed and arranged that the joint will be leak-proof and will not loosen under vibration.

Further objects of the invention will appear from the following specification taken in connection with the drawing which forms a part of this application, and in which Fig. 1 is a longitudinal sectional view showing the coupling and tube flaring means in separated position prior to the flaring of the tube end and the coupling of the coupling members thereto;

Fig. 2 is a view similar to Fig. 1 but showing the parts in the position taken after the flaring and coupling operations have been completed; and Fig. 3 is an end elevation of the split collar which is secured to the tube at a point spaced from the end thereof and holds the tube from longitudinal movement during the flaring and coupling operation.

The invention briefly described consists of a method of and means for flaring the end of the tube and securing coupling members thereto. The means used for accomplishing the purpose of the invention comprise a split collar having a roughened or serrated inner surface arranged to grip the tube at a point spaced from the end thereof, a coupling member having a central bore therethrough and a conical projection surrounding the bore and adapted to enter the end of the tube and a second coupling member arranged to coact with the first coupling member in forcing the conical projection into the end of the tube.

Further details of the invention will appear from the following description.

In the particular embodiment of the invention illustrated in the drawing there is shown a tube 10 of ductile metal, such as copper, and a collar 11 having a roughened or serrated inner surface or bore 12 arranged to firmly grip the tube when the collar is compressed thereon. The collar has a conical internal surface 13 which extends longitudinally from one edge thereof and is also provided with a conical outer surface 14.

The coupling comprises two coupling members A and B, one of these members having an outer threaded surface 15 and the other member having an internal threaded surface 16 arranged to coact in drawing these coupling members A and B together.

The coupling member A has a central bore 17 therethrough and is provided with a conical projection 18, the smallest diameter of this projection or, in other words, the diameter at the outer end thereof being slightly less than the internal diameter of the tube 10 so that the conical projection can enter the end of the tube prior to the flaring thereof. The incline of the conical surface 18 with reference to the axis of the bore 17 corresponds to the incline of the internal conical surface 13 of the split collar 11.

The coupling member B is provided with an internal conical surface 20 which corresponds in inclination to the inclination of the outer conical surface 14 of the split collar 11.

In using the device and in carrying out the method the split collar 11 is compressed on the tube at a point spaced from the end thereof to firmly grip the tube and form an abutment thereon. The coupling member B is placed on the tube in back of the collar 11, preferably before the collar is gripped thereon. Otherwise the coupling member must be placed on the tube from the other end thereof.

After the collar has been secured to the tube at the desired point spaced from the end of the tube the coupling member B is moved over the collar so that the inclined or conical surface 20 will engage the outer conical surface 15 of the collar. The internal threaded surface 16 of the coupling member B is then engaged with the outer threaded surface 15 of the coupling member A and these two members are threaded one on the other, forcing the conical projection 18 into the end of the tube, as shown in Fig. 2. This causes the end of the tube to flare outwardly and the flared portion is firmly gripped between the surface 13, of the collar and the outer surface of the conical projection 18 of the coupling member A.

It will be evident from the foregoing description that tubing can be cut and flared in any desired lengths and that repairs can be easily and quickly made in the field. Dealers can buy the tubing in lengths, and not stock specific lengths.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

Means for flaring and coupling the end of a tube of ductile metal comprising a split collar having an irregular internal surface adapted to be compressed into intimate engagement with said tube at a point spaced from the end thereof for holding the collar against slippage on the tube, said collar having an inclined outer surface and a tapered inner surface extending axially from one edge of the collar, a coupling member having a tapered projection surrounding a central bore, the inclination of said tapered surface corresponding to the inclination of the tapered inner surface on the collar, and a second coupling member having an inclined inner surface inclined to correspond to and coact with the inclined outer surface of the collar, said coupling members being arranged for threaded engagement with each other.

STEPHEN GUARNASCHELLI.